United States Patent
Yavuz et al.

(10) Patent No.: US 8,437,762 B2
(45) Date of Patent: *May 7, 2013

(54) ADAPTIVE TRANSMISSION (TX)/RECEPTION (RX) PULSE SHAPING FILTER FOR FEMTOCELL BASE STATIONS AND MOBILE STATIONS WITHIN A NETWORK

(75) Inventors: Mehmet Yavuz, San Diego, CA (US); Yu-Chuan Lin, Carlsbad, CA (US); Yeliz Tokgoz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 439 days.

This patent is subject to a terminal disclaimer.

(21) Appl. No.: 12/539,341

(22) Filed: Aug. 11, 2009

(65) Prior Publication Data

US 2010/0048215 A1 Feb. 25, 2010

Related U.S. Application Data

(60) Provisional application No. 61/090,569, filed on Aug. 20, 2008.

(51) Int. Cl.
*H04B 15/00* (2006.01)
*H04M 1/00* (2006.01)

(52) U.S. Cl.
USPC .......................................... 455/444; 455/561

(58) Field of Classification Search .................. 455/436, 455/435.1, 422.1, 561, 550.1, 63.1, 444; 370/331, 338, 342, 208
See application file for complete search history.

(56) References Cited

U.S. PATENT DOCUMENTS

| | | |
|---|---|---|
| 7,142,613 B2 | 11/2006 | Beaulieu |
| 2003/0185313 A1 | 10/2003 | Beaulieu |
| 2004/0101074 A1 | 5/2004 | Wilson |
| 2007/0133712 A1 | 6/2007 | Benjebbour et al. |
| 2008/0013643 A1 | 1/2008 | Lee |
| 2008/0031377 A1 | 2/2008 | Taylor |
| 2008/0037411 A1* | 2/2008 | Niemela et al. ............... 370/208 |
| 2008/0107072 A1 | 5/2008 | Viorel et al. |

(Continued)

FOREIGN PATENT DOCUMENTS

| | | |
|---|---|---|
| EP | 1239640 A1 | 9/2002 |
| JP | 2007166324 A | 6/2007 |

(Continued)

OTHER PUBLICATIONS

International Search Report and Written Opinion—PCT/US2009/054547, International Search Authority—European Patent Office—Feb. 17, 2010.

(Continued)

*Primary Examiner* — Melody Mehrpour

(74) *Attorney, Agent, or Firm* — Florin C. Corie

(57) ABSTRACT

A mobile station may include a standard transmit pulse-shaping filter, a standard receive pulse-shaping filter, a narrower transmit pulse-shaping filter, and a narrower receive pulse-shaping filter. A femtocell base station may include a narrower transmit pulse-shaping filter and a narrower receive pulse-shaping filter. The mobile station may utilize the narrower transmit pulse-shaping filter for transmitting uplink signals and the narrower receive pulse-shaping filter for receiving downlink signals when it is receiving service from the femtocell base station. The mobile station may utilize the standard transmit pulse-shaping filter for transmitting uplink signals and the standard receive pulse-shaping filter for receiving downlink signals when it is receiving service from a macrocell base station.

28 Claims, 12 Drawing Sheets

U.S. PATENT DOCUMENTS

| | | | |
|---|---|---|---|
| 2008/0187072 A1 | 8/2008 | Schell et al. | |
| 2008/0304451 A1* | 12/2008 | Thompson | 370/331 |
| 2009/0122771 A1* | 5/2009 | Cai | 370/338 |
| 2009/0135797 A1* | 5/2009 | Zhang et al. | 370/338 |
| 2009/0310561 A1* | 12/2009 | Grob et al. | 370/331 |
| 2010/0048221 A1 | 2/2010 | Yavuz et al. | |

FOREIGN PATENT DOCUMENTS

| | | |
|---|---|---|
| JP | 2010536258 A | 11/2010 |
| JP | 2011505759 | 2/2011 |
| KR | 100773745 B1 | 11/2007 |
| WO | 2007125570 A1 | 11/2007 |
| WO | WO2007126351 | 11/2007 |
| WO | WO2009020975 | 2/2009 |
| WO | WO2009070602 | 6/2009 |
| WO | WO2009076274 A2 | 6/2009 |

OTHER PUBLICATIONS

Aricent: "Challenges in Deployment of UMTS/HSPA Femtocell", [Online] Feb. 2008, XP002566189 Retrieved from the Internet: URL:http://previ ew-careers.ari cent.com/i n/ whitepapters/wireless-and-convergence/femto eel 1-deployment.pdf> [retrieved on Jan. 28, 2010] pp. 1-8.

International Search Report and Written Opinion PCT/US09/059734 International Search Authority European Patent Office Apr. 27, 2010.

Humblet, P., et al., "System design of CDMA2000 femtocells", IEEE Communications Magazine, Sep. 1, 2009, pp. 92-100, vol. 47, No. 9, IEEE Service Center, Piscataway, US, XP011283370, ISSN: 0163-6804, LNKDDOI: 10.1109/MC0M.2009.5277461, p. 97,98 Preferred User Zone List, Dual Mode Mobile issues.

* cited by examiner

ADAPTIVE TRANSMISSION (TX)/RECEPTION (RX) PULSE SHAPING FILTER FOR FEMTOCELL BASE STATIONS AND MOBILE STATIONS WITHIN A NETWORK

RELATED APPLICATIONS

This application is related to and claims priority from U.S. patent application Ser. No. 61/090,569, filed Aug. 20, 2008, for "Adaptive Transmission (Tx)/Reception (Rx) Pulse Shaping Filter For Access Point Base Stations And Mobile Stations Within A Network," which is incorporated herein by reference.

TECHNICAL FIELD

The present disclosure relates generally to communication systems. More specifically, the present disclosure relates to an adaptive transmission (Tx)/reception (Rx) pulse shaping filter for femtocell base stations and mobile stations within a network.

BACKGROUND

Wireless communication systems have become an important means by which many people worldwide have come to communicate. A wireless communication system may provide communication for a number of mobile stations, each of which may be serviced by a base station.

As used herein, the term "mobile station" refers to an electronic device that may be used for voice and/or data communication over a wireless communication system. Examples of mobile stations include cellular phones, personal digital assistants (PDAs), wireless modems, laptop computers, etc. A mobile station may alternatively be referred to as an access terminal, a mobile terminal, a subscriber station, a remote station, a user terminal, a terminal, a subscriber unit, a mobile device, a wireless device, user equipment, or some other terminology.

The term "base station" refers to a wireless communication station that is installed at a fixed location and used to communicate with mobile stations. A base station may alternatively be referred to as an access point, a Node B, an evolved Node B, or some other similar terminology.

A mobile station may communicate with one or more base stations via transmissions on the uplink and the downlink. The uplink (or reverse link) refers to the communication link from the mobile station to the base station, and the downlink (or forward link) refers to the communication link from the base station to the mobile station.

A femtocell base station is a small cellular base station, typically designed for use in residential or small business environments. It connects to the service provider's network via broadband (such as DSL or cable). A femtocell base station allows service providers to extend service coverage indoors, especially where access would otherwise be limited or unavailable. A femtocell base station may alternatively be referred to as an access point base station, a Home Node B (HNB), a Home evolved Node B (HeNB), femto node, etc.

The coverage area of a femtocell base station may be referred to herein as a femtocell. The coverage area of a typical base station may be referred to herein as a macrocell, and a typical base station may be referred to herein as a macrocell base station.

Adjacent channel interference is interference caused by extraneous power from a signal in an adjacent channel. Adjacent channel interference may occur between two mobile stations, where one of the mobile stations is receiving service from a femtocell base station and the other mobile station is receiving service from a macrocell base station, and where the two mobile stations are operating at adjacent carriers. The present disclosure relates to reducing adjacent channel interference, particularly where the interfering channels involve a femtocell base station and a macrocell base station.

DETAILED DESCRIPTION

Figure 1:
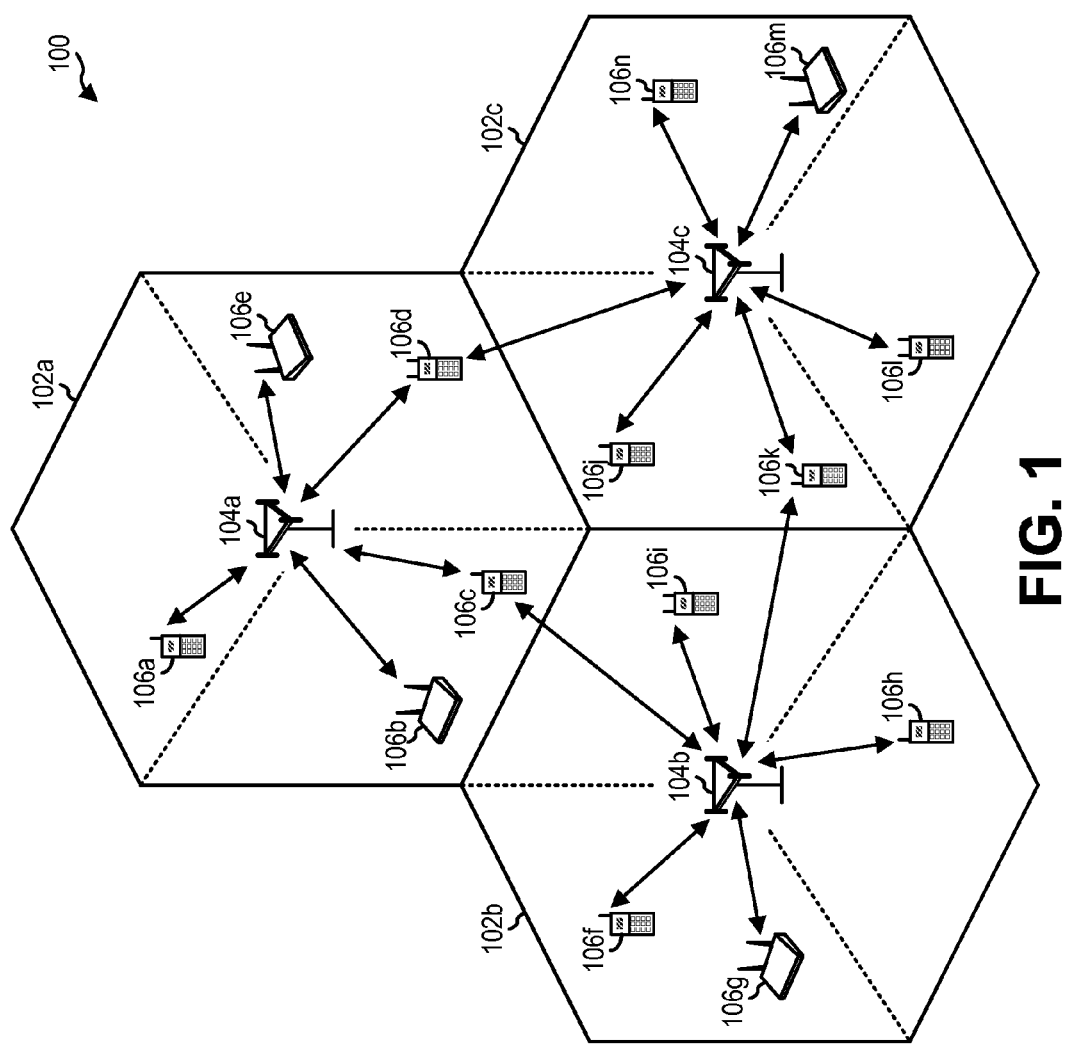
FIG. 1 illustrates a wireless communication system that is configured to support a number of users.

A femtocell base station that is configured for limiting adjacent channel interference is disclosed. The femtocell base station includes a transmitter for transmitting downlink signals to a first mobile station. The first mobile station is located within a femtocell. The femtocell base station also includes a narrower transmit pulse-shaping filter. The narrower transmit pulse-shaping filter is configured so that a bandwidth of the downlink signals that are transmitted by the femtocell base station is less than a bandwidth of downlink signals that are transmitted by a macrocell base station to a second mobile station.

The femtocell base station may also include a receiver for receiving uplink signals from the first mobile station. The femtocell base station may also include a narrower receive pulse-shaping filter that matches a narrower transmit pulse-shaping filter at the first mobile station. The narrower transmit pulse-shaping filter at the first mobile station may be configured so that a bandwidth of the uplink signals that are transmitted by the first mobile station is less than a bandwidth of uplink signals that are transmitted by the second mobile station to the macrocell base station.

As mentioned, the femtocell base station includes a narrower transmit pulse-shaping filter. A narrower receive pulse-shaping filter at the first mobile station may match the narrower transmit pulse-shaping filter at the femtocell base station.

The macrocell base station may cover a macrocell. The femtocell may be located within the macrocell. The second mobile station may also be located within the femtocell.

A mobile station that is configured for limiting adjacent channel interference is disclosed. The mobile station includes a transmitter for transmitting uplink signals. The mobile station also includes a transmit pulse-shaping filter that limits bandwidth of the uplink signals transmitted by the mobile station. The mobile station also includes a narrower transmit pulse-shaping filter that limits the bandwidth of the uplink signals transmitted by the mobile station to a greater extent than the transmit pulse-shaping filter.

The mobile station may also include a switching mechanism for switching between the transmit pulse-shaping filter and the narrower transmit pulse-shaping filter. As an example, the switching mechanism may be configured to switch from the transmit pulse-shaping filter to the narrower transmit pulse-shaping filter in response to detecting that a handoff from a macrocell base station to a femtocell base station has occurred. The switching mechanism may be configured to switch from the narrower transmit pulse-shaping filter to the transmit pulse-shaping filter in response to detecting that a handoff from a femtocell base station to a macrocell base station has occurred. Of course, other switching mechanisms are also possible within the scope of the present disclosure.

The mobile station may further include a receiver for receiving downlink signals. The mobile station may also include a receive pulse-shaping filter that matches a transmit pulse-shaping filter at a macrocell base station. The mobile station may also include a narrower receive pulse-shaping filter that matches a narrower transmit pulse-shaping filter at a femtocell base station. The mobile station may further include a switching mechanism for switching between the receive pulse-shaping filter and the narrower receive pulse-shaping filter. As an example, the switching mechanism may be configured to switch from the receive pulse-shaping filter to the narrower receive pulse-shaping filter in response to detecting that a handoff from the macrocell base station to the femtocell base station has occurred. The switching mechanism may be configured to switch from the narrower receive pulse-shaping filter to the receive pulse-shaping filter in response to detecting that a handoff from the femtocell base station to the macrocell base station has occurred. Of course, other switching mechanisms are also possible within the scope of the present disclosure.

A method for increasing the signal-to-noise ratio (SNR) with respect to a received signal and for limiting adjacent uplink channel interference is disclosed. The method is implemented by a mobile station. The method includes detecting that a handoff from a macrocell base station to a femtocell base station has occurred. The method also includes switching from a receive pulse-shaping filter to a narrower receive pulse-shaping filter. The method also includes using the narrower receive pulse-shaping filter to receive downlink transmissions from the femtocell base station.

The method may also include switching from a transmit pulse-shaping filter to a narrower transmit pulse-shaping filter. The method may also include using the narrower transmit pulse-shaping filter to send uplink transmissions to the femtocell base station.

The method may further include detecting that a handoff from the femtocell base station to the macrocell base station has occurred. The method may also include switching from the narrower receive pulse-shaping filter to the receive pulse-shaping filter. The method may also include using the receive pulse-shaping filter to receive downlink transmissions from the macrocell base station. The method may also include switching from a narrower transmit pulse-shaping filter to a transmit pulse-shaping filter. The method may further include using the transmit pulse-shaping filter to send uplink transmissions to the macrocell base station.

An apparatus that is configured to increase the signal-to-noise ratio (SNR) with respect to a received signal and to limit adjacent uplink channel interference is disclosed. The apparatus includes means for detecting that a handoff from a macrocell base station to a femtocell base station has occurred. The apparatus also includes means for switching from a receive pulse-shaping filter to a narrower receive pulse-shaping filter. The apparatus also includes means for using the narrower receive pulse-shaping filter to receive downlink transmissions from the femtocell base station.

A computer-program product for increasing the signal-to-noise ratio (SNR) with respect to a received signal and for limiting adjacent uplink channel interference is disclosed. The computer-program product includes a computer-readable medium having instructions thereon. The instructions include code for detecting that a handoff from a macrocell base station to a femtocell base station has occurred. The instructions also include code for switching from a receive pulse-shaping filter to a narrower receive pulse-shaping filter. The instructions also include code for using the narrower receive pulse-shaping filter to receive downlink transmissions from the femtocell base station.

FIG. 1 illustrates a wireless communication system 100 that is configured to support a number of users. The system 100 provides communication for multiple macrocells 102 (e.g., macrocells 102a-c), with each macrocell 102 being serviced by a corresponding macrocell base station (BS) 104 (e.g., macrocell BSs 104a-c). Mobile stations 106 (e.g., mobile stations 106a-n) may be dispersed at various locations throughout the system 100 over time. Each mobile station (MS) 106 may communicate with one or more macrocell base stations 104 on an uplink and/or a downlink at a given moment, depending upon whether the MS 106 is active and whether it is in soft handoff, for example. The wireless communication system 100 may provide service over a large geographic region.

Figure 2:
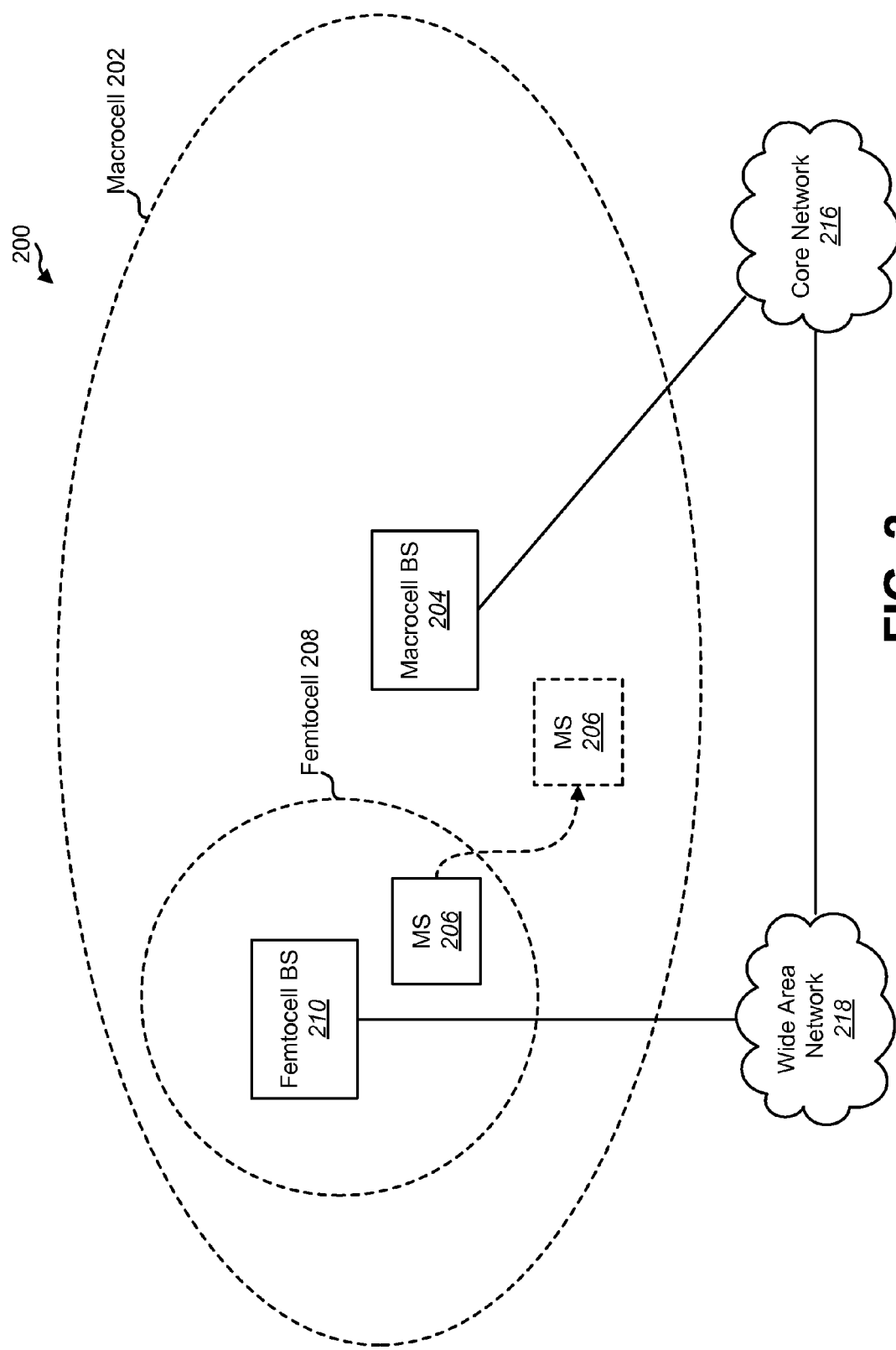
FIG. 2 illustrates a wireless communication system that includes a femtocell base station and a macrocell base station.

FIG. 2 illustrates a wireless communication system 200 that includes a femtocell BS 210 and a macrocell BS 204. The coverage area of the femtocell BS 210 may be referred to as a femtocell 208, while the coverage area of the macrocell BS 204 may be referred to herein as a macrocell 202. The macrocell 202 may be considerably larger than the femtocell 208. For example, the radius of the macrocell 202 may be on the order of several kilometers, whereas the femtocell 208 may cover a home or a small building. The femtocell 208 may be thought of as a small, isolated coverage area located within the macrocell 202.

The femtocell BS 210 may be coupled to a wide area network 218 (e.g., the Internet) and a mobile operator core network 216 via a DSL router, a cable modem, a wireless link, or other connectivity means. The macrocell BS 204 may also be coupled to the core network 216.

The MS 206 may be capable of receiving service from the femtocell BS 210, and it also may be capable of receiving service from the macrocell BS 204. For example, the femtocell BS 210 may provide service to an MS 206 when the MS 206 is located within the femtocell 208. When the MS 206 moves outside of the femtocell 208 but is still located within the macrocell 202, the macrocell BS 204 may provide service to the MS 206.

Figure 3:
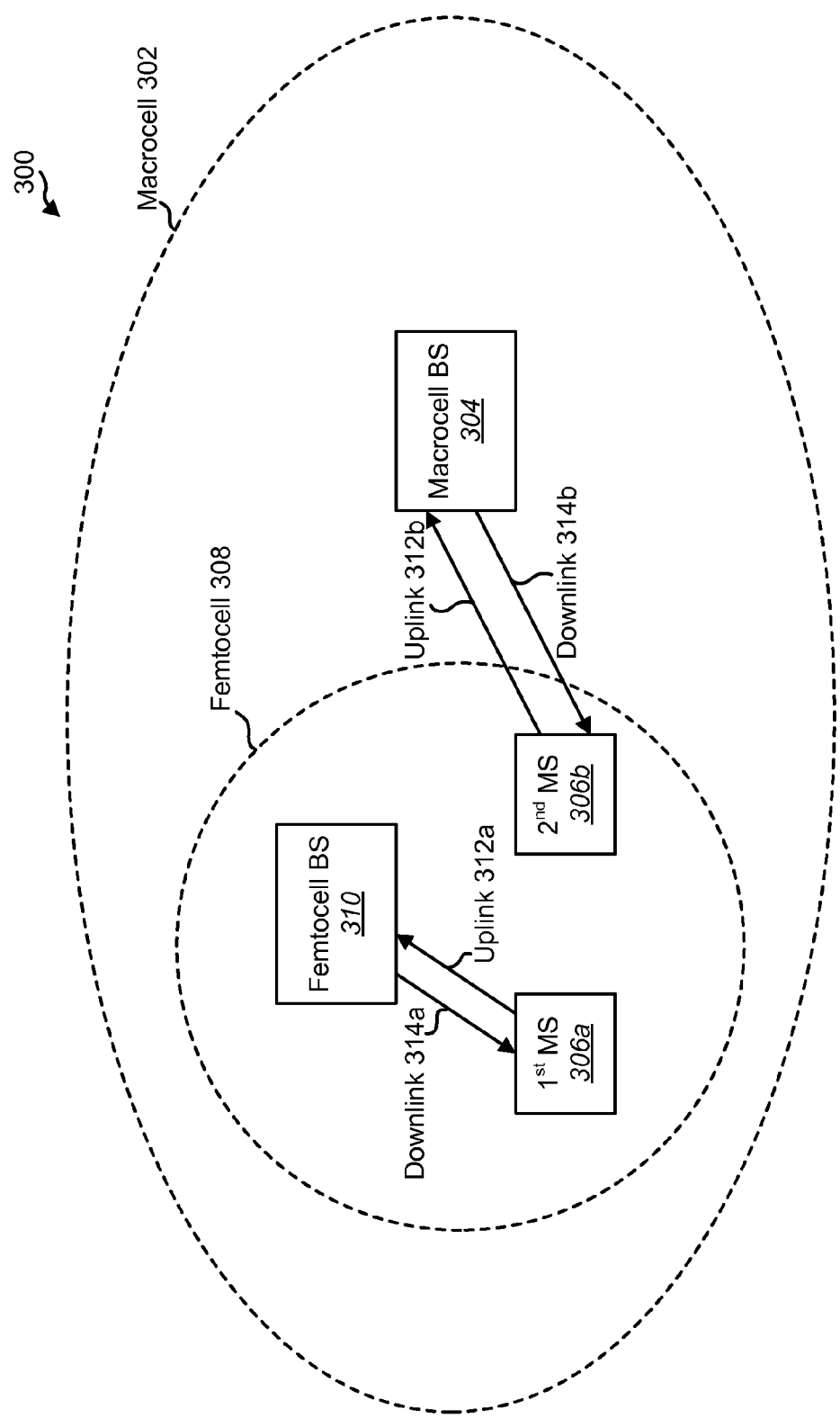
FIG. 3 illustrates a wireless communication system that includes a first mobile station and a second mobile station, in which adjacent channel interference may occur.

FIG. 3 illustrates a wireless communication system 300 in which a first MS 306a and a second MS 306b are located within a femtocell 308 that is located within a macrocell 302. The first MS 306a is receiving service from a femtocell BS 310. The first MS 306a sends data to the femtocell BS 310 via an uplink 312a, and receives data from the femtocell BS 310 via a downlink 314a. However, even though the second MS 306b is located within the femtocell 308, the second MS 306b is receiving service from a macrocell BS 304. For example, the femtocell BS 310 may be located within a person's home, and the second MS 306b may belong to someone who is visiting the person's home but who is not authorized to receive service from the femtocell BS 310. The second MS 306b sends data to the macrocell BS 304 via an uplink 312b, and receives data from the macrocell BS 304 via a downlink 314b.

The second MS 306b may be located relatively close to the femtocell BS 310. As a result, transmissions from the second MS 306b to the macrocell BS 304 on the uplink 312b may be received at the femtocell BS 310, and may therefore interfere with transmissions from the first MS 306a to the femtocell BS 310 on the uplink 312a. If adjacent carriers are used for the uplinks 312a, 312b, then this interference may be referred to as adjacent uplink channel interference.

Similarly, transmissions from the femtocell BS 310 to the first MS 306a on the downlink 314a may be received at the second MS 306b, and may therefore interfere with transmissions from the macrocell BS 304 to the second MS 306b on the downlink 314b. If adjacent carriers are used for the downlinks 314a, 314b, then this interference may be referred to as adjacent downlink channel interference.

Although in FIG. 3 the second MS 306b is located within the femtocell 308, adjacent uplink channel interference and adjacent downlink channel interference may occur even if the second MS 306b is located outside of the femtocell 308. The methods disclosed herein may be utilized whether the second MS 306b is located inside or outside of the femtocell 308.

Figure 4:
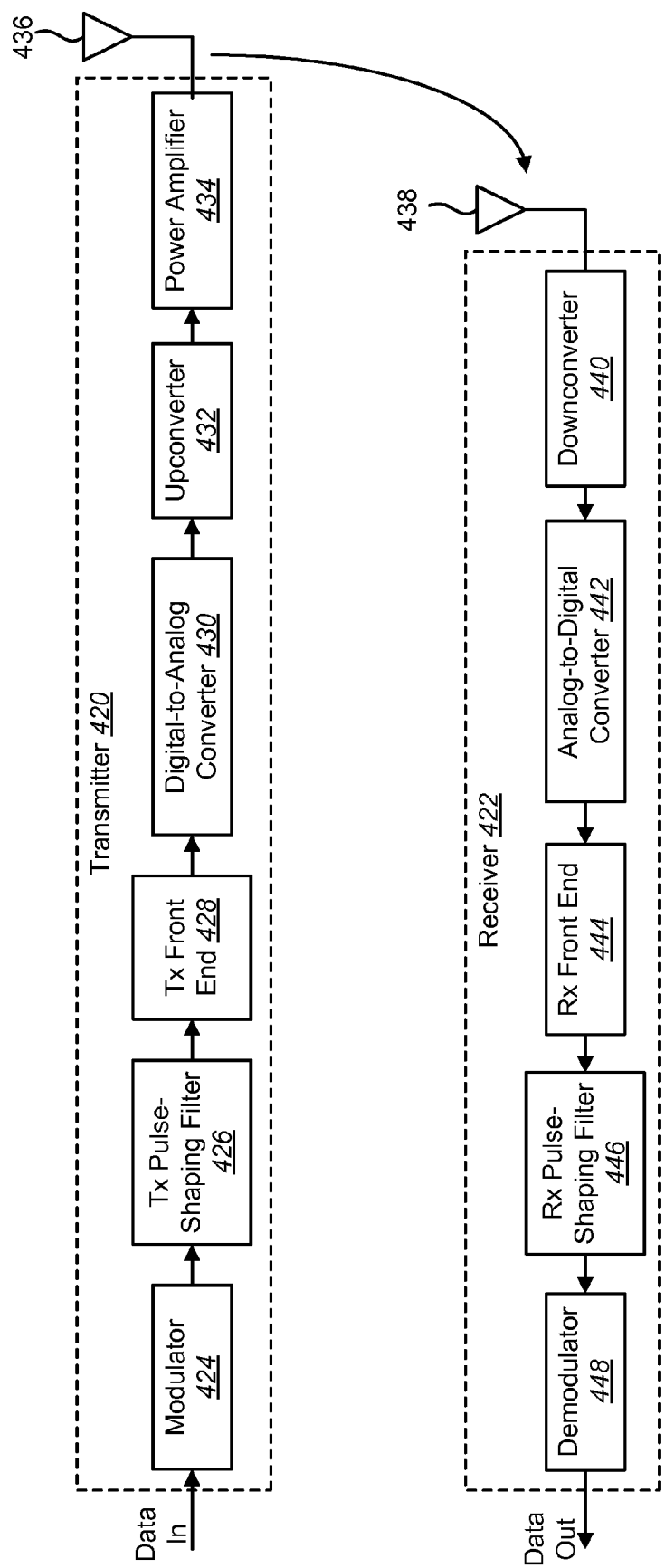
FIG. 4 illustrates a transmitter and a receiver in a wireless communication system.

FIG. 4 illustrates a transmitter 420 and a receiver 422 in a wireless communication system 400. The transmitter 420 accepts digital data, converts it to a modulated radio frequency (RF) signal, and transmits the signal to the receiver 422. The receiver 422 receives the RF signal and demodulates it so as to reproduce the data.

The digital data provided to the transmitter 420 may be modulated by a modulator 424 to produce a sequence of modulated samples that represent symbols, in accordance with a certain modulation format. The modulated samples may be filtered by a transmitter (Tx) pulse-shaping filter 426 to produce a sequence of filtered samples. The Tx pulse-shaping filter 426 is a digital filter, which may be implemented as a finite impulse response (FIR) filter.

A Tx front end 428 may process the output of the Tx pulse-shaping filter 426. The Tx front end 428 may perform functions such as interpolation, predistortion and/or other filtering operations. The filtered samples may be provided to a digital-to-analog converter (DAC) 430, which produces an analog signal representing the modulated and filtered sample sequence at its input. The analog signal may then be upconverted to a suitable radio frequency by an upconverter (UC) 432 and amplified by a power amplifier (PA) 434. The RF signal may then be transmitted via a transmit antenna 436.

A receive antenna 438 may receive the transmitted signal and provide it to a downconverter 440, which downconverts the signal from RF to a suitable intermediate frequency (IF) or baseband analog signal. The analog signal may be digitized by an analog-to-digital converter (ADC) 442, which produces a sequence of digitized samples. The digitized samples may be processed by a receiver (Rx) front end 444, which may perform functions such as decimation, automatic gain control (AGC) and/or other adaptive filtering operations. The samples may then be filtered by an Rx pulse-shaping filter 446. The Rx pulse-shaping filter 446 is a digital filter, which may be implemented as an FIR filter. The samples at the output of the Rx pulse-shaping filter 446 may be demodulated by a demodulator 448, which reproduces and outputs the data provided to the transmitter 420.

The spectral responses of the Tx pulse-shaping filter 426 and the Rx pulse-shaping filter 446 may have a significant influence on the performance of the communication system 400. For example, the Tx pulse-shaping filter 426 limits the spectral bandwidth of the transmitted signal, often determining the level of adjacent channel interference and other spurious emissions generated by the transmitter 420. When the transmitter 420 conforms to a particular communication standard, the bandwidth of the transmitted signal is typically specified in the standard, often using a spectral mask, which should not be exceeded.

The Tx pulse-shaping filter 426 and the Rx pulse-shaping filter 446 should be matched to one another. For example, the Tx pulse-shaping filter 426 and the Rx pulse-shaping filter 446 may be implemented so that they each have a root raised cosine (RRC) response, and so that their combined spectral response is a raised cosine (RC) spectral response. Of course, RRC is provided as an example only; the Tx pulse-shaping filter 426 and the Rx pulse-shaping filter 446 do not have to be implemented so that they each have an RRC response. However, they should have the same response such that the Rx pulse-shaping filter 446 is matched to the Tx pulse-shaping filter 426, so as to maximize the signal-to-noise ratio (SNR).

The femtocell BS 310, the macrocell BS 304, and the MSs 306a, 306b in the system 300 of FIG. 3 may each include a transmitter and a receiver that is configured similarly to the transmitter 420 and the receiver 422 that are shown in FIG. 4.

Figure 5:
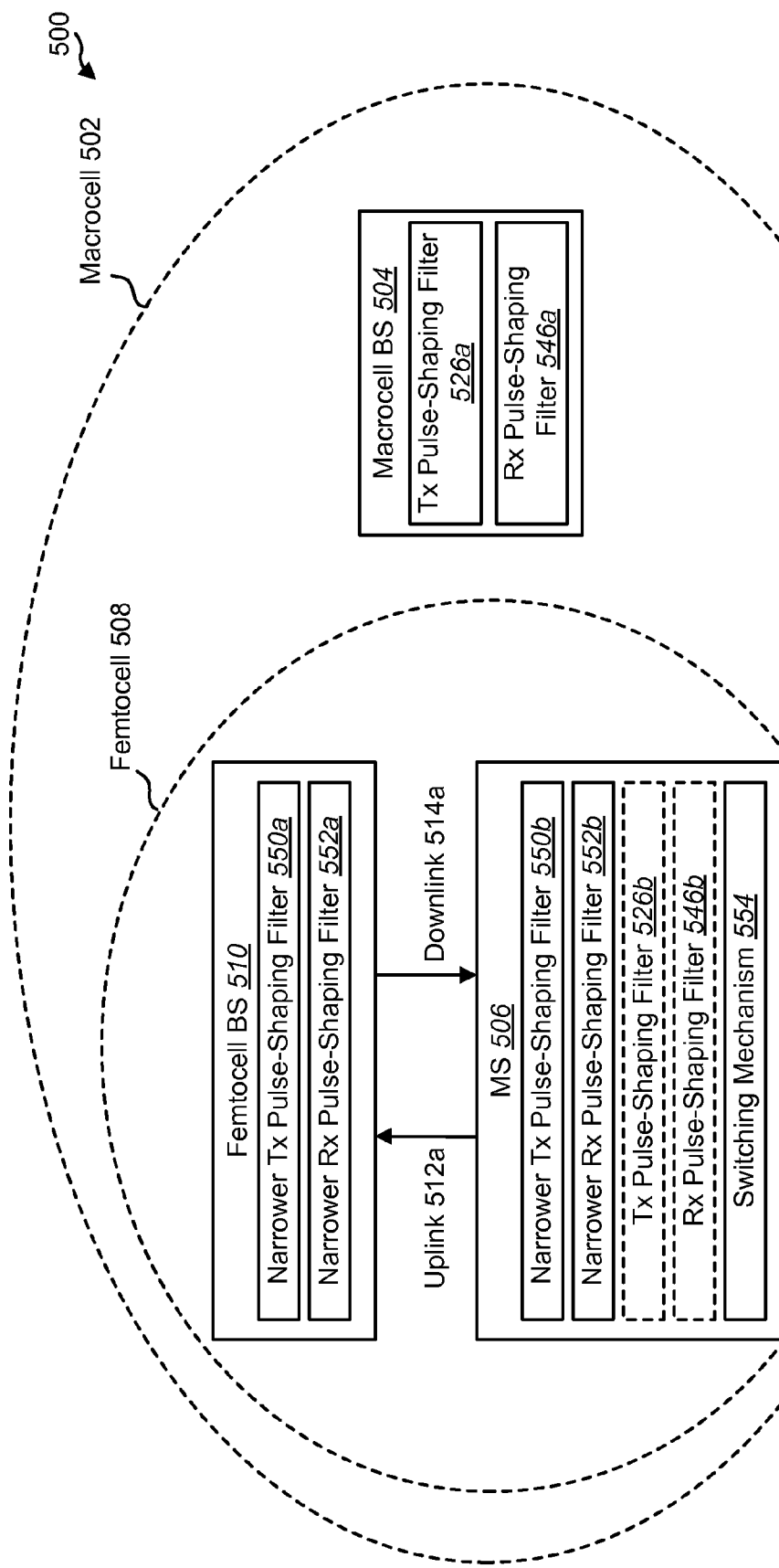
FIGS. 5 and 6 illustrate a system in which a femtocell base station utilizes a narrower transmit pulse-shaping filter whereas a macrocell base station within the system utilizes a standard transmit pulse-shaping filter.
Figure 6:
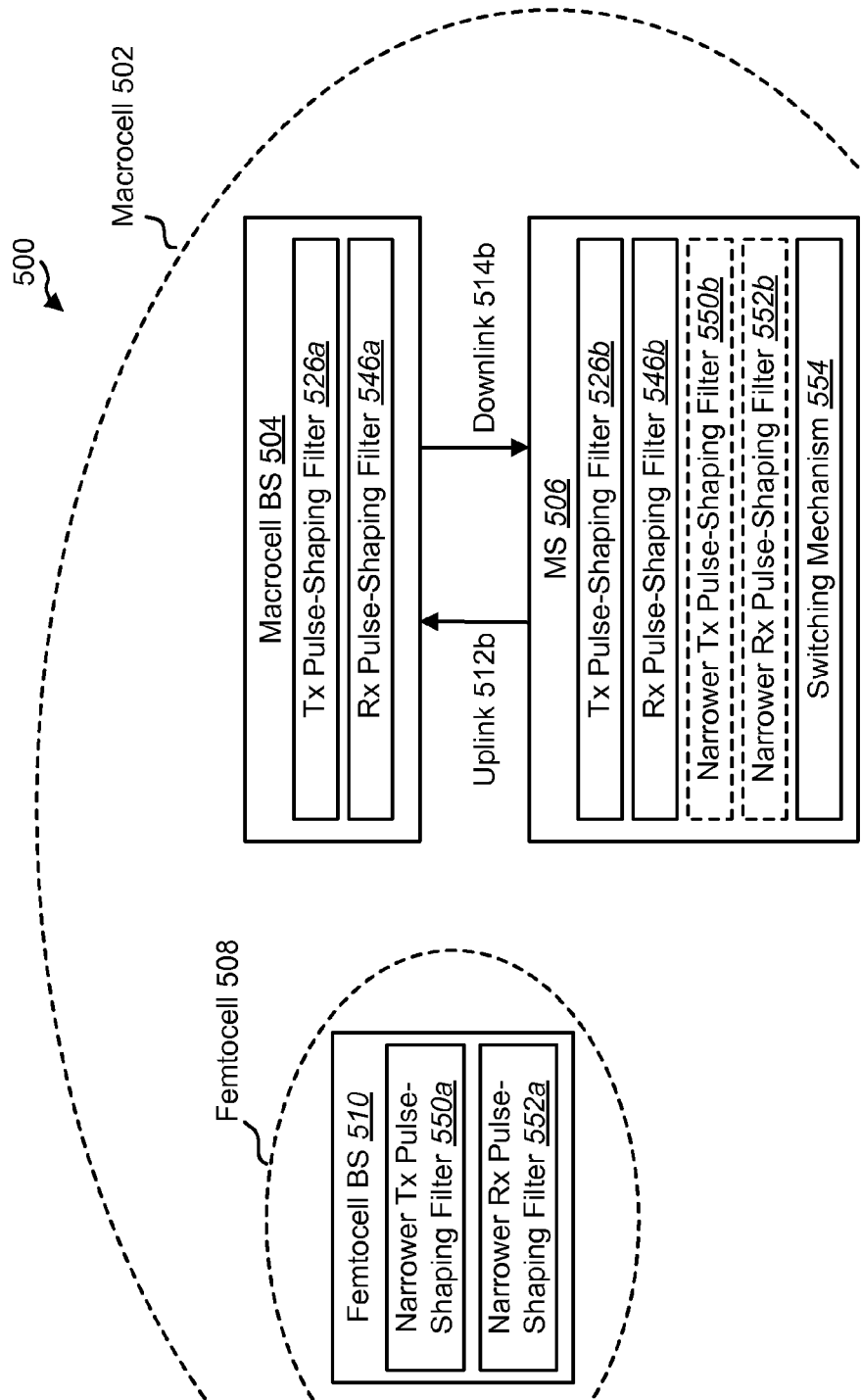

FIGS. 5 and 6 illustrate one possible approach to reducing the type of adjacent channel interference that was described above in connection with FIG. 3. With the illustrated approach, a femtocell BS 510 within a wireless communication system 500 utilizes a narrower Tx pulse-shaping filter 550a, whereas a macrocell BS 504 within the system 500 utilizes a standard Tx pulse-shaping filter 526a. The term "narrower" in this context means that the Tx pulse-shaping filter 550a utilized by the femtocell BS 510 limits the spectral bandwidth of downlink 514a signals that are transmitted by the femtocell BS 510 to a greater extent than the Tx pulse-shaping filter 526a limits the spectral bandwidth of downlink 514b signals that are transmitted by the macrocell BS 504. For example, in one possible implementation, the 3 dB bandwidth of the narrower Tx pulse-shaping filter 550a may be 90% of the 3 dB bandwidth of the standard Tx pulse-shaping filter 526a. However, this value is provided for purposes of example only, and should not be used to limit the scope of the present disclosure.

An MS 506 within the system 500 includes both a narrower Rx pulse-shaping filter 552b that matches the narrower Tx pulse-shaping filter 550a of the femtocell BS 510, and also a standard Rx pulse-shaping filter 546b that matches the standard Tx pulse-shaping filter 526a of the macrocell BS 504.

The MS 506 includes both a narrower Tx pulse-shaping filter 550b and a standard Tx pulse-shaping filter 526b. The narrower Tx pulse-shaping filter 550a limits the spectral bandwidth of uplink 512*a* signals transmitted by the MS 506 to a greater extent than the standard Tx pulse-shaping filter 526*b* limits the spectral bandwidth of uplink 512*b* signals transmitted by the MS 506. The femtocell BS 510 includes a narrower Rx pulse-shaping filter 552*a* that matches the narrower Tx pulse-shaping filter 550*b* of the MS 506. The macrocell BS 504 includes a standard Rx pulse-shaping filter 546*a* that matches the standard Rx pulse-shaping filter 546*b* of the MS 506.

The MS 506 is capable of operating in at least two different configurations. In a first configuration, the MS 506 utilizes the narrower Tx pulse-shaping filter 550*b* and the narrower Rx pulse-shaping filter 552*b*. In a second configuration, the MS 506 utilizes the standard Tx pulse-shaping filter 526*b* and the standard Rx pulse-shaping filter 546*b*. The MS 506 also includes a switching mechanism 554 for switching between the first configuration and the second configuration.

FIG. 5 illustrates the MS 506 being located within the femtocell 508. The MS 506 is communicating with the femtocell BS 510 via an uplink 512*a* and a downlink 514*a*. The MS 506 is in the first configuration mentioned above, i.e., it is utilizing the narrower Tx pulse-shaping filter 550*b* (which matches the narrower Rx pulse-shaping filter 552*a* utilized by the femtocell BS 510) and the narrower Rx pulse-shaping filter 552*b* (which matches the narrower Tx pulse-shaping filter 550*a* utilized by the femtocell BS 510).

FIG. 6 illustrates the MS 506 being located outside of the femtocell 508, but still within the macrocell 502. The MS 506 is communicating with the macrocell BS 504 via an uplink 512*b* and a downlink 514*b*. The MS 506 is in the second configuration mentioned above, i.e., it is utilizing the standard Tx pulse-shaping filter 526*b* (which matches the standard Rx pulse-shaping filter 546*a* utilized by the macrocell BS 504) and the standard Rx pulse-shaping filter 546*b* (which matches the standard Tx pulse-shaping filter 526*a* utilized by the macrocell BS 504).

Figure 7:
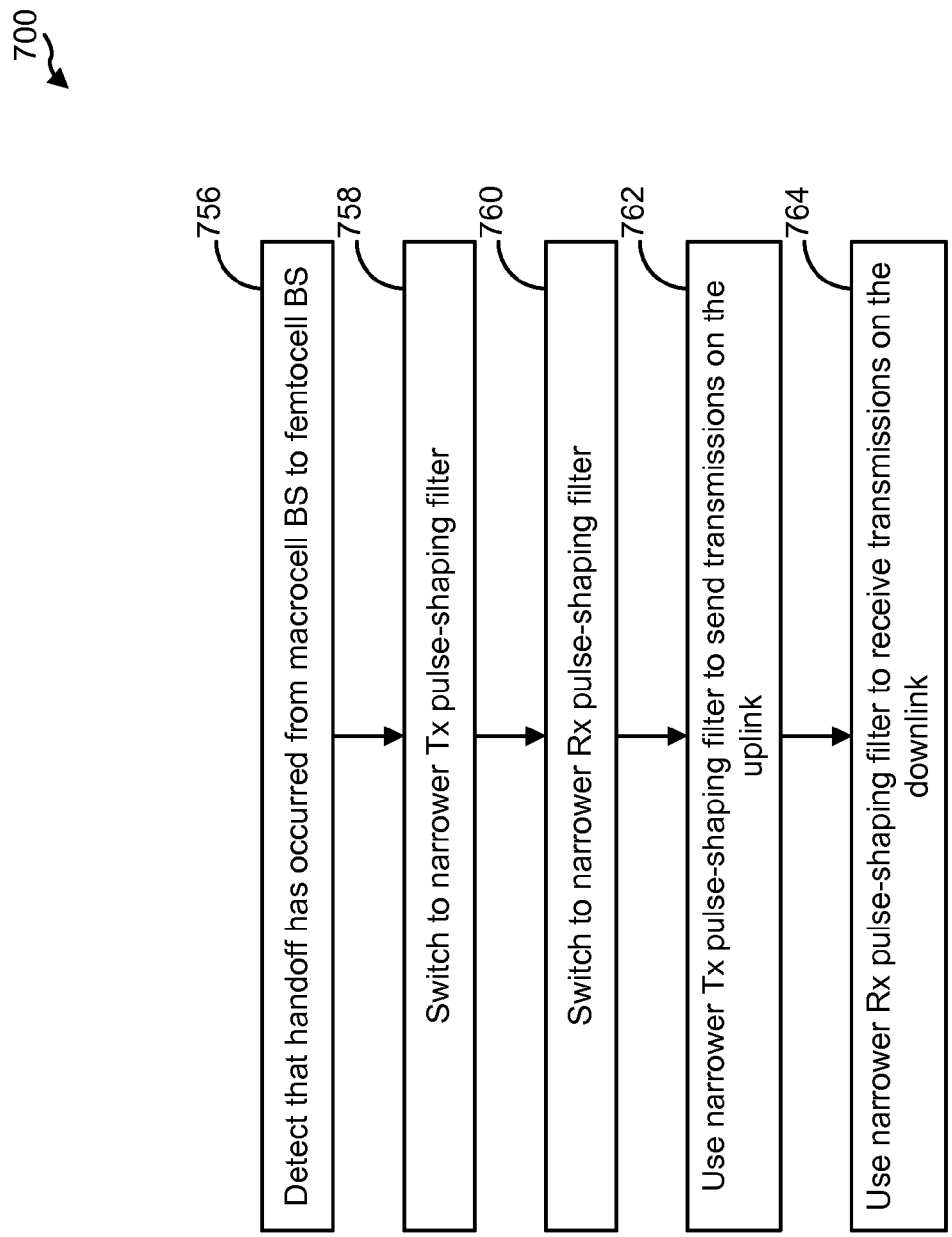
FIG. 7 illustrates a method that may be performed by the mobile station in the system of FIGS. 5 and 6 when it detects that handoff has occurred from a macrocell base station to a femtocell base station.

More specifically, referring to FIG. 7, when the MS 506 detects 756 that handoff has occurred from the macrocell BS 504 to the femtocell BS 510, the MS 506 may switch 758 to the narrower Tx pulse-shaping filter 550*b* and switch 760 to the narrower Rx pulse-shaping filter 552*b*. The MS 506 may then use 762 the narrower Tx pulse-shaping filter 550*b* to send transmissions to the femtocell BS 510 on the uplink 512*a*, and use 764 the narrower Rx pulse-shaping filter 552*b* to receive transmissions from the femtocell BS 510 on the downlink 514*a*.

Figure 8:
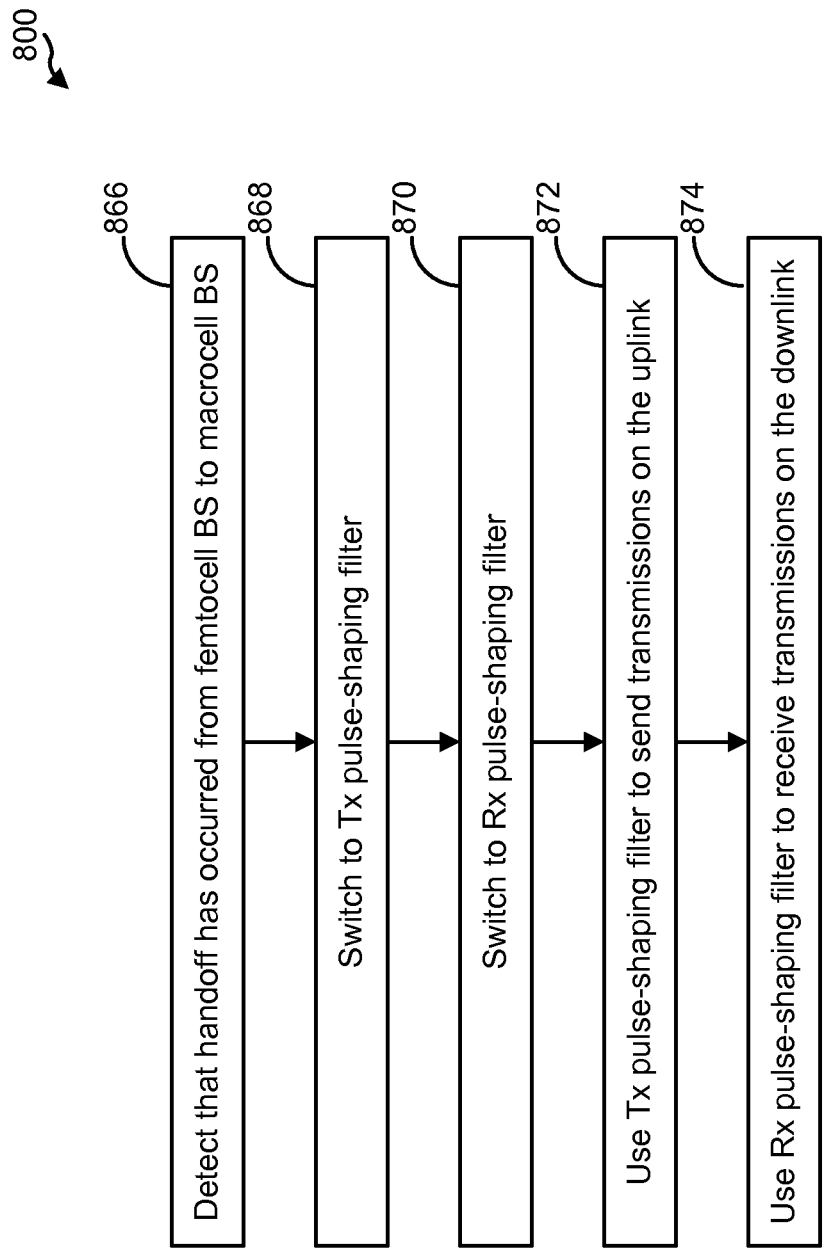
FIG. 8 illustrates a method that may be performed by the mobile station in the system of FIGS. 5 and 6 when it detects that handoff has occurred from a femtocell base station to a macrocell base station.

Referring now to FIG. 8, when the MS 506 detects 866 that handoff has occurred from the femtocell BS 510 to the macrocell BS 504, the MS 506 may switch 868 to the standard Tx pulse-shaping filter 526*b* and switch 870 to the standard Rx pulse-shaping filter 546*b*. The MS 506 may then use 872 the standard Tx pulse-shaping filter 526*b* to send transmissions to the macrocell BS 504 on the uplink 512*b*, and use 874 the standard Rx pulse-shaping filter 546*b* to receive transmissions from the macrocell BS 504 on the downlink 514*b*.

In the above discussion, it is assumed that the MS 506 detects whether it is being served by the macrocell BS 504 or the femtocell BS 510, and the MS 506 automatically switches to the appropriate pulse-shaping filters. Alternatively, or in addition, when the MS 506 is being served by the femtocell BS 510, the femtocell BS 510 can instruct the MS 506 to switch to the narrower Tx pulse-shaping filter 550*b* and the narrower Rx pulse-shaping filter 552*b*.

Figure 9:
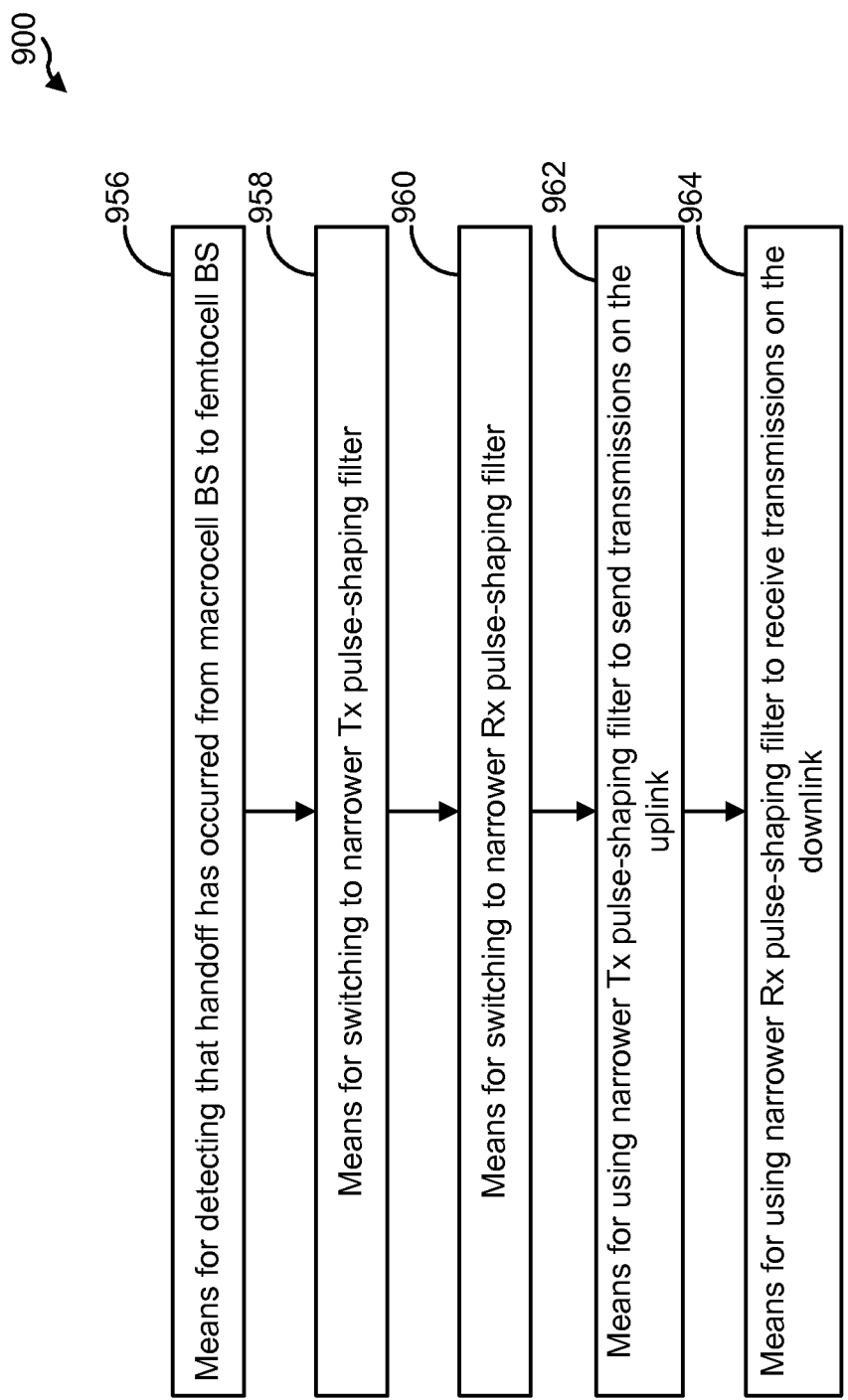
FIG. 9 illustrates means-plus-function blocks corresponding to the method of FIG. 7.

The method 700 of FIG. 7 described above may be performed by various hardware and/or software component(s) and/or module(s) corresponding to the means-plus-function blocks 900 illustrated in FIG. 9. In other words, blocks 756 through 764 illustrated in FIG. 7 correspond to means-plus-function blocks 956 through 964 illustrated in FIG. 9.

Figure 10:
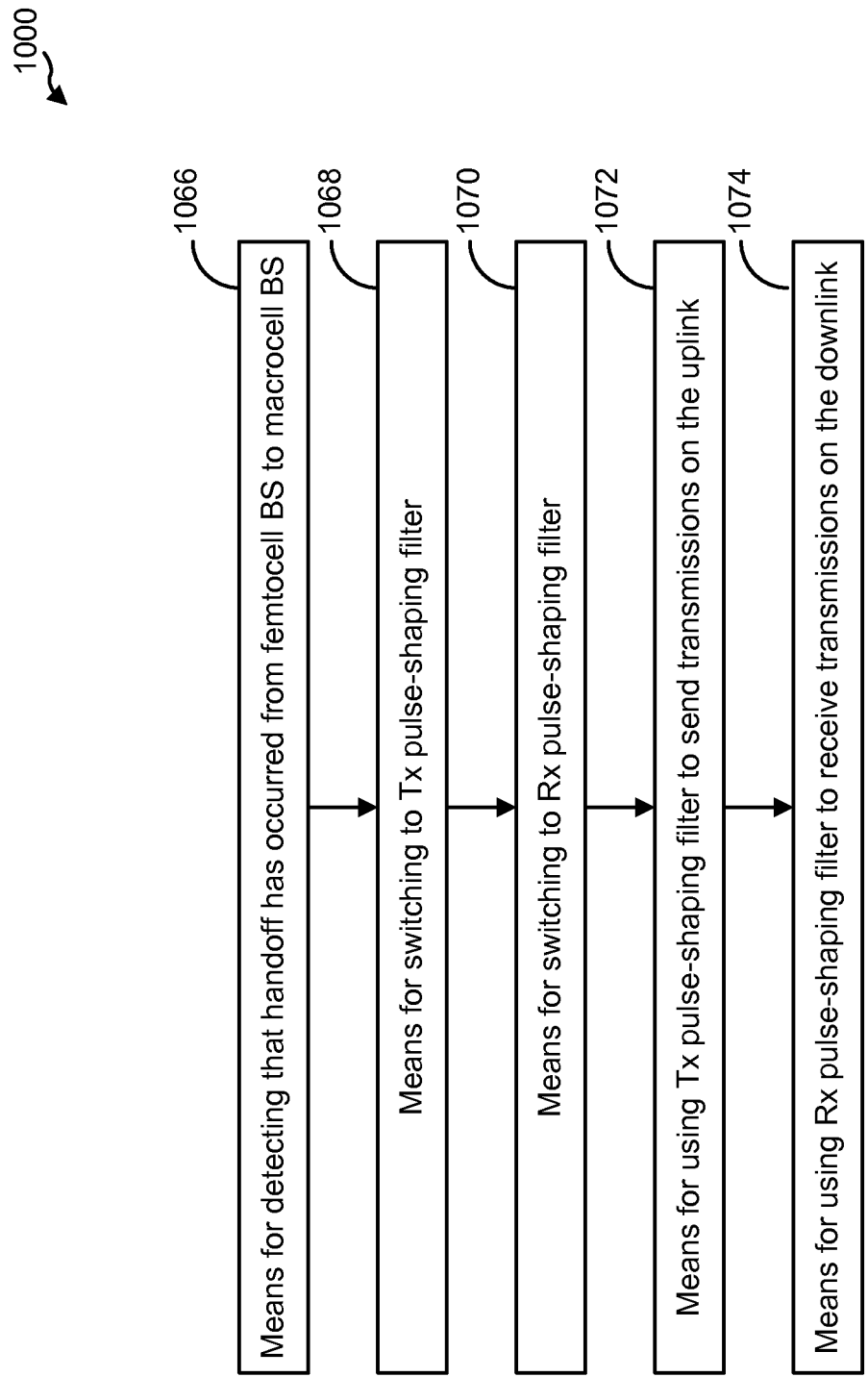
FIG. 10 illustrates means-plus-function blocks corresponding to the method of FIG. 8.

Similarly, the method 800 of FIG. 8 described above may be performed by various hardware and/or software component(s) and/or module(s) corresponding to the means-plus-function blocks 1000 illustrated in FIG. 10. In other words, blocks 866 through 874 illustrated in FIG. 8 correspond to means-plus-function blocks 1066 through 1074 illustrated in FIG. 10.

Figure 11:
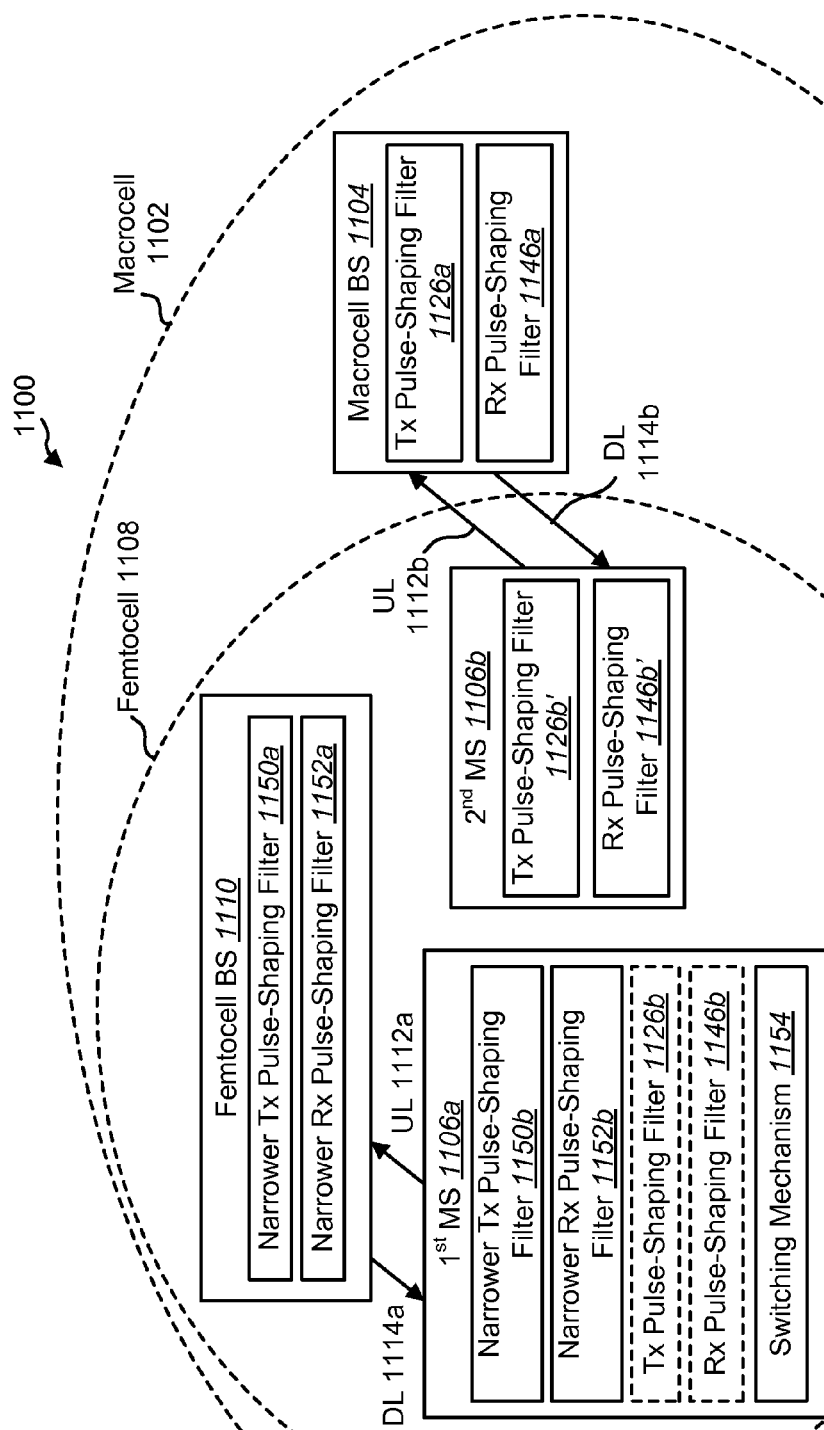
FIG. 11 illustrates another system in which a femtocell base station utilizes a narrower transmit pulse-shaping filter whereas a macrocell base station within the system utilizes a standard transmit pulse-shaping filter, and in which a first mobile station and a second mobile station are located within a femtocell.

FIG. 11 illustrates a system 1100 that is similar to the system 300 that was discussed above in connection with FIG. 3. In particular, FIG. 11 illustrates a system 1100 where a first MS 1106*a* and a second MS 1106*b* are located within a femtocell 1108 that is located within a macrocell 1102. Like the system 300 discussed above in connection with FIG. 3, the first MS 1106*a* is receiving service from a femtocell BS 1110. The first MS 1106*a* sends data to the femtocell BS 1110 via an uplink 1112*a*, and receives data from the femtocell BS 1110 via a downlink 1114*a*. Even though the second MS 1106*b* is located within the femtocell 1108, the second MS 1106*b* is receiving service from a macrocell BS 1104. The second MS 1106*b* sends data to the macrocell BS 1104 via an uplink 1112*b*, and receives data from the macrocell BS 1104 via a downlink 1114*b*.

In the system 300 that was discussed above in connection with FIG. 3, the femtocell BS 310, the macrocell BS 304, and the MSs 306*a*, 306*b* each utilize the same Tx pulse-shaping filter 426 and the same Rx pulse-shaping filter 446. In contrast, in the system 1100 shown in FIG. 11, the femtocell BS 1110, the macrocell BS 1104, and the MSs 1106*a*, 1106*b* do not utilize the same Tx pulse-shaping filter and the same Rx pulse-shaping filter.

The femtocell BS 1110 utilizes a narrower Tx pulse-shaping filter 1150*a*, whereas the macrocell BS 1104 utilizes a standard Tx pulse-shaping filter 1126*a*. The narrower Tx pulse-shaping filter 1150*a* limits the spectral bandwidth of the downlink 1114*a* signals that are transmitted by the femtocell BS 1110 to a greater extent than the standard Tx pulse-shaping filter 1126*a* limits the spectral bandwidth of the downlink signals 1114*b* that are transmitted by the macrocell BS 1104. The first MS 1106*a* includes a narrower Rx pulse-shaping filter 1152*b* that matches the narrower Tx pulse-shaping filter 1150*a* of the femtocell BS 1110 (for use when the first MS 1106*a* is located within the femtocell 1108 and is receiving service from the femtocell BS 1110), and a standard Rx pulse-shaping filter 1146*b* that matches the standard Tx pulse-shaping filter 1126*a* of the macrocell BS 1104 (for use when the first MS 1106*a* is located outside of the femtocell 1108 but within the macrocell 1104 and is receiving service from the macrocell BS 1104). The second MS 1106*b* includes a standard Rx pulse-shaping filter 1146*b*' that matches the standard Tx pulse-shaping filter 1126*a* of the macrocell BS 1104.

The first MS 1106*a* utilizes both a narrower Tx pulse-shaping filter 1150*b* (for use when the first MS 1106*a* is located within the femtocell 1108 and is receiving service from the femtocell BS 1110) and a standard Tx pulse-shaping filter 1126*b* (for use when the first MS 1106*a* is located outside of the femtocell 1108 but within the macrocell 1104 and is receiving service from the macrocell BS 1104). The second MS 1106*b* includes a standard Tx pulse-shaping filter 1126*b*'. The narrower Tx pulse-shaping filter 1150*b* limits the spectral bandwidth of the uplink 1112*a* signals that are transmitted by the first MS 1106*a* to a greater extent than the standard Tx pulse-shaping filter 1126*b* limits the spectral bandwidth of the uplink signals that are transmitted by the first MS 1106*a*, or than the standard Tx pulse-shaping filter 1126b' limits the spectral bandwidth of the uplink 1112b signals that are transmitted by the second MS 1106b. The femtocell BS 1110 includes a narrower Rx pulse-shaping filter 1152a that matches the narrower Tx pulse-shaping filter 1150b of the first MS 1106a. The macrocell BS 1104 includes a standard Rx pulse-shaping filter 1146a that matches the standard Tx pulse-shaping filter 1126b of the first MS 1106a and the standard Tx pulse-shaping filter 1126b' of the second MS 1106b.

As with the system 300 described above in connection with FIG. 3, the second MS 1106b may be located relatively close to the femtocell BS 1110. As a result, transmissions from the second MS 1106b to the macrocell BS 1104 on the uplink 1112b may be received at the femtocell BS 1110, and may therefore interfere with transmissions from the first MS 1106a to the femtocell BS 1110 on the uplink 1112a. If adjacent carriers are used for the uplinks 1112a, 1112b, then this interference may be referred to as adjacent uplink channel interference. However, because the first MS 1106a utilizes a narrower Tx pulse-shaping filter 1150b, the adjacent uplink channel interference that occurs in the system 1100 of FIG. 11 may be significantly less than the adjacent uplink channel interference that occurs in the system 300 of FIG. 3. Also, the femtocell BS 1110 utilizes a narrower Rx pulse-shaping filter 1152a, thereby increasing the signal-to-noise ratio (SNR) with respect to the received signal.

Similarly, transmissions from the femtocell BS 1110 to the first MS 1106a on the downlink 1114a may be received at the second MS 1106b, and may therefore interfere with transmissions from the macrocell BS 1104 to the second MS 1106b on the downlink 1114b. If adjacent carriers are used for the downlinks 1114a, 1114b, then this interference may be referred to as adjacent downlink channel interference. However, because the femtocell BS 1110 utilizes a narrower Tx pulse-shaping filter 1150a, the adjacent downlink channel interference that occurs in the system 1100 of FIG. 11 may be significantly less than the adjacent downlink channel interference that occurs in the system 300 of FIG. 3. Also, the first MS 1106a utilizes a narrower Rx pulse-shaping filter 1152b, thereby increasing the SNR with respect to the received signal.

Figure 12:
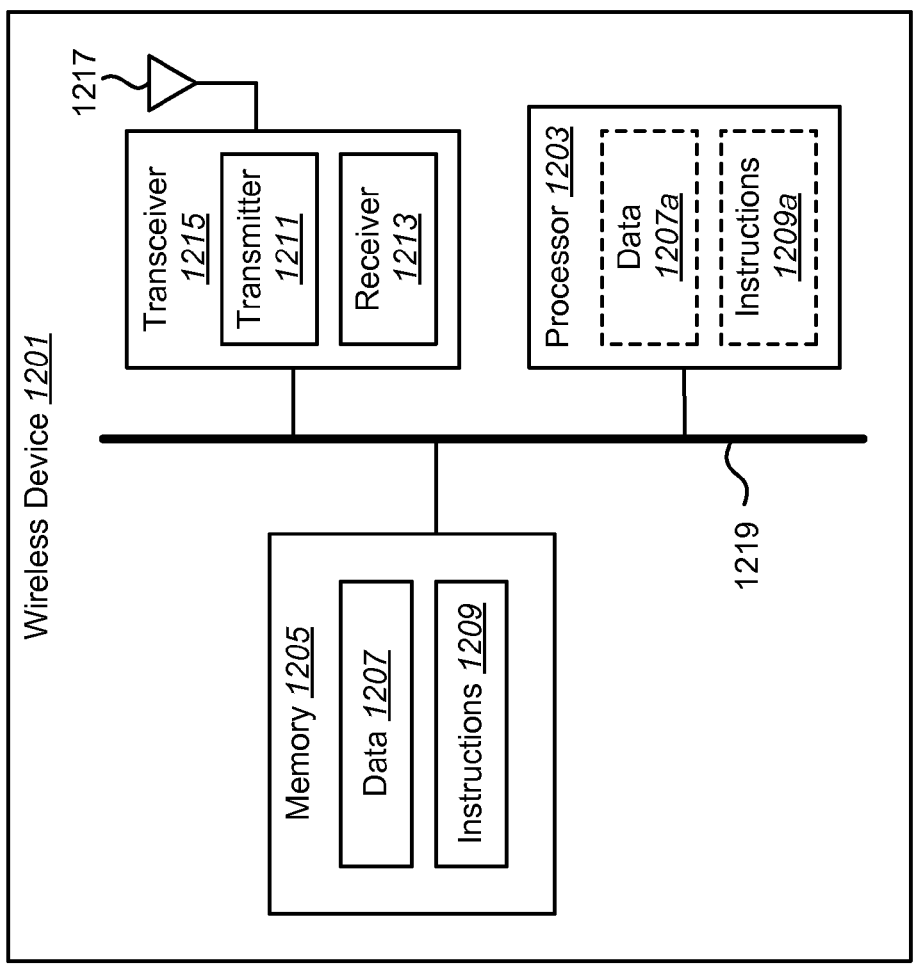
FIG. 12 illustrates certain components that may be included within a wireless device.

FIG. 12 illustrates certain components that may be included within a wireless device 1201. The wireless device 1201 may be a mobile station or a base station.

The wireless device 1201 includes a processor 1203. The processor 1203 may be a general purpose single- or multi-chip microprocessor (e.g., an ARM), a special purpose microprocessor (e.g., a digital signal processor (DSP)), a microcontroller, a programmable gate array, etc. The processor 1203 may be referred to as a central processing unit (CPU). Although just a single processor 1203 is shown in the wireless device 1201 of FIG. 12, in an alternative configuration, a combination of processors (e.g., an ARM and DSP) could be used.

The wireless device 1201 also includes memory 1205. The memory 1205 may be any electronic component capable of storing electronic information. The memory 1205 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1207 and instructions 1209 may be stored in the memory 1205. The instructions 1209 may be executable by the processor 1203 to implement the methods disclosed herein. Executing the instructions 1209 may involve the use of the data 1207 that is stored in the memory 1205. A certain amount of data 1207a and instructions 1209a may be loaded into the processor 1203.

The wireless device 1201 may also include a transmitter 1211 and a receiver 1213 to allow transmission and reception of signals between the wireless device 1201 and a remote location. The transmitter 1211 and receiver 1213 may be collectively referred to as a transceiver 1215.

If the wireless device 1201 is a mobile station 506, then the transmitter 1211 may include both a narrower Tx pulse-shaping filter 550b and a standard Tx pulse-shaping filter 526b, and the receiver 1213 may include both a narrower Rx pulse-shaping filter 552b and a standard Rx pulse-shaping filter 546b. If the wireless device 1201 is a femtocell base station 510, then the transmitter 1211 may include a narrower Tx pulse-shaping filter 550a, and the receiver 1213 may include a narrower Rx pulse-shaping filter 552a. If the wireless device 1201 is a macrocell base station 504, then the transmitter 1211 may include a standard Tx pulse-shaping filter 526a, and the receiver 1213 may include a standard Rx pulse-shaping filter 546a.

An antenna 1217 may be electrically coupled to the transceiver 1215. The wireless device 1201 may also include (not shown) multiple transmitters, multiple receivers, multiple transceivers and/or multiple antenna.

The various components of the wireless device 1201 may be coupled together by one or more buses, which may include a power bus, a control signal bus, a status signal bus, a data bus, etc. For the sake of clarity, the various buses are illustrated in FIG. 12 as a bus system 1219.

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 7 and 8, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A femtocell base station that is configured for limiting adjacent channel interference, comprising:
a transmitter for transmitting downlink signals to a first mobile station, wherein the first mobile station is located within a femtocell; and
a narrower transmit pulse-shaping filter, wherein the narrower transmit pulse-shaping filter is configured so that a bandwidth of the downlink signals that are transmitted by the femtocell base station is less than a bandwidth of downlink signals that are transmitted by a macrocell base station to a second mobile station.

2. The femtocell base station of claim 1, further comprising:
a receiver for receiving uplink signals from the first mobile station; and
a narrower receive pulse-shaping filter that matches a narrower transmit pulse-shaping filter at the first mobile station.

3. The femtocell base station of claim 2, wherein the narrower transmit pulse-shaping filter at the first mobile station is configured so that a bandwidth of the uplink signals that are transmitted by the first mobile station is less than a bandwidth of uplink signals that are transmitted by the second mobile station to the macrocell base station.

4. The femtocell base station of claim 1, wherein a narrower receive pulse-shaping filter at the first mobile station matches the narrower transmit pulse-shaping filter.

5. The femtocell base station of claim 1, wherein the macrocell base station covers a macrocell, and wherein the femtocell is located within the macrocell.

6. The femtocell base station of claim 1, wherein the second mobile station is also located within the femtocell.

7. A mobile station that is configured for limiting adjacent channel interference, comprising:
a transmitter for transmitting uplink signals;
a transmit pulse-shaping filter that limits bandwidth of the uplink signals transmitted by the mobile station; and
a narrower transmit pulse-shaping filter that limits the bandwidth of the uplink signals transmitted by the mobile station to a greater extent than the transmit pulse-shaping filter;
a switching mechanism for switching between the transmit pulse-shaping filter and the narrower transmit pulse-shaping filter, wherein the switching mechanism is configured to switch from the transmit pulse-shaping filter to the narrower transmit pulse-shaping filter in response to detecting that a handoff from a macrocell base station to a femtocell base station has occurred.

8. The mobile station of claim 7, wherein the switching mechanism is configured to switch from the narrower transmit pulse-shaping filter to the transmit pulse-shaping filter in response to detecting that a handoff from a femtocell base station to a macrocell base station has occurred.

9. The mobile station of claim 7, further comprising:
a receiver for receiving downlink signals;
a receive pulse-shaping filter that matches a transmit pulse-shaping filter at a macrocell base station; and
a narrower receive pulse-shaping filter that matches a narrower transmit pulse-shaping filter at a femtocell base station.

10. The mobile station of claim 9, further comprising a switching mechanism for switching between the receive pulse-shaping filter and the narrower receive pulse-shaping filter.

11. The mobile station of claim 10, wherein the switching mechanism is configured to switch from the receive pulse-shaping filter to the narrower receive pulse-shaping filter in response to detecting that a handoff from the macrocell base station to the femtocell base station has occurred.

12. The mobile station of claim 10, wherein the switching mechanism is configured to switch from the narrower receive pulse-shaping filter to the receive pulse-shaping filter in response to detecting that a handoff from the femtocell base station to the macrocell base station has occurred.

13. A method for increasing the signal-to-noise ratio (SNR) with respect to a received signal and for limiting adjacent uplink channel interference, the method being implemented by a mobile station, the method comprising:
detecting that a handoff from a macrocell base station to a femtocell base station has occurred;
switching from a receive pulse-shaping filter to a narrower receive pulse-shaping filter; and using the narrower receive pulse-shaping filter to receive downlink transmissions from the femtocell base station.

14. The method of claim 13, wherein the narrower receive pulse-shaping filter matches a narrower transmit pulse-shaping filter at the femtocell base station.

15. The method of claim 13, further comprising:
switching from a transmit pulse-shaping filter to a narrower transmit pulse-shaping filter; and
using the narrower transmit pulse-shaping filter to send uplink transmissions to the femtocell base station.

16. The method of claim 15, wherein the narrower transmit pulse-shaping filter limits a bandwidth of the uplink transmissions to a greater extent than the transmit pulse-shaping filter.

17. The method of claim 13, further comprising:
detecting that a handoff from the femtocell base station to the macrocell base station has occurred;
switching from the narrower receive pulse-shaping filter to the receive pulse-shaping filter; and
using the receive pulse-shaping filter to receive downlink transmissions from the macrocell base station.

18. The method of claim 17, further comprising:
switching from a narrower transmit pulse-shaping filter to a transmit pulse-shaping filter; and
using the transmit pulse-shaping filter to send uplink transmissions to the macrocell base station.

19. An apparatus that is configured to increase the signal-to-noise ratio (SNR) with respect to a received signal and to limit adjacent uplink channel interference, comprising:
means for detecting that a handoff from a macrocell base station to a femtocell base station has occurred;
means for switching from a receive pulse-shaping filter to a narrower receive pulse-shaping filter; and
means for using the narrower receive pulse-shaping filter to receive downlink transmissions from the femtocell base station.

20. The apparatus of claim 19, wherein the narrower receive pulse-shaping filter matches a narrower transmit pulse-shaping filter at the femtocell base station.

21. The apparatus of claim 19, further comprising:
means for switching from a transmit pulse-shaping filter to a narrower transmit pulse-shaping filter; and
means for using the narrower transmit pulse-shaping filter to send uplink transmissions to the femtocell base station.

22. The apparatus of claim 21, wherein the narrower transmit pulse-shaping filter limits a bandwidth of the uplink transmissions to a greater extent than the transmit pulse-shaping filter.

23. The apparatus of claim 19, further comprising:
means for detecting that a handoff from the femtocell base station to the macrocell base station has occurred;
means for switching from the narrower receive pulse-shaping filter to the receive pulse-shaping filter; and
means for using the receive pulse-shaping filter to receive downlink transmissions from the macrocell base station.

24. The apparatus of claim 23, further comprising:
means for switching from a narrower transmit pulse-shaping filter to a transmit pulse-shaping filter; and
means for using the transmit pulse-shaping filter to send uplink transmissions to the macrocell base station.

25. A computer-program product for increasing the signal-to-noise ratio (SNR) with respect to a received signal and for limiting adjacent uplink channel interference, the computer-program product comprising a non-transitory computer-readable medium having instructions thereon, the instructions comprising:
code for detecting that a handoff from a macrocell base station to a femtocell base station has occurred;
code for switching from a receive pulse-shaping filter to a narrower receive pulse-shaping filter; and
code for using the narrower receive pulse-shaping filter to receive downlink transmissions from the femtocell base station.

26. The computer-program product of claim 25, further comprising:
code for switching from a transmit pulse-shaping filter to a narrower transmit pulse-shaping filter; and
code for using the narrower transmit pulse-shaping filter to send uplink transmissions to the femtocell base station.

27. The computer-program product of claim 25, further comprising:
code for detecting that a handoff from the femtocell base station to the macrocell base station has occurred;
code for switching from the narrower receive pulse-shaping filter to the receive pulse-shaping filter; and
code for using the receive pulse-shaping filter to receive downlink transmissions from the macrocell base station.

28. The computer-program product of claim 27, further comprising:
code for switching from a narrower transmit pulse-shaping filter to a transmit pulse-shaping filter; and
code for using the transmit pulse-shaping filter to send uplink transmissions to the macrocell base station.

* * * * *